(12) United States Patent
Yang

(10) Patent No.: US 7,327,526 B1
(45) Date of Patent: Feb. 5, 2008

(54) BUFFER STRUCTURE OF CONTACT TYPE LENS AND CONTACT TYPE LENS HAVING BUFFER STRUCTURE

(75) Inventor: Chih-Yi Yang, Taipei (TW)

(73) Assignee: Lumos Technology Co., Ltd., Taipei (TW)

( * ) Notice: Subject to any disclaimer, the term of this patent is extended or adjusted under 35 U.S.C. 154(b) by 0 days.

(21) Appl. No.: 11/685,222

(22) Filed: Mar. 13, 2007

(51) Int. Cl.
*G02B 7/02* (2006.01)

(52) U.S. Cl. ............... 359/811; 359/813; 359/819; 359/822

(58) Field of Classification Search ............... 359/811, 359/813, 819, 822, 399, 404, 407
See application file for complete search history.

(56) References Cited

U.S. PATENT DOCUMENTS 6,088,174 A * 7/2000 Cox ..................... 359/819

* cited by examiner

*Primary Examiner*—Timothy J. Thompson

(57) ABSTRACT

A buffer structure is installed at the front end of a contact type lens and includes a flexible sheathing ring, a through hole disposed on the sheathing hole and corresponding to the lens, a circular contact pad portion extended outward from a lower end of the sheathing ring, and a circular sheathing portion formed at an upper end of the sheathing ring and connected to the front end of the lens.

6 Claims, 3 Drawing Sheets

BUFFER STRUCTURE OF CONTACT TYPE LENS AND CONTACT TYPE LENS HAVING BUFFER STRUCTURE

BACKGROUND OF THE INVENTION

1. Field of the Invention

The present invention relates to a lens, and more particular to a component or an accessory of a contact type of lens installed to a buffer structure at the front end of the contact type lens.

2. Description of Prior Art

At present, high-precision microscopic instruments are used for testing an electronic component or a circuit board at a near distance and determining whether or not there is any defect or flaw. However, various different electronic components come with different shapes and appearances, particularly the lens of a microscope not necessarily has an appropriate plane or surface for flatly placing the lens very near to a position for testing the circuit board, and this problem occurs very often. Therefore, the lens may be tilted, or the testing cannot be performed successfully, or a testing objective may even be collided and damaged by the lens, since the lens at the front end of the microscope gets very close to the testing object and may hit the testing object during the process of testing the components or accessories. As a result, the testing cannot be carried out easily, and the number of defectives may be increased due to the improper testing.

SUMMARY OF THE INVENTION

In view of the foregoing shortcomings of the prior art, the inventor of the present invention based on years of experience in the related industry to conduct experiments and modifications, and finally invented a buffer structure of a contact type lens and a contact type lens having the buffer structure in accordance with the present invention to overcome the shortcomings of the prior art.

It is a primary objective of the present invention to provide a buffer structure of a contact type lens and a contact type lens having the buffer structure, wherein the buffer structure is installed at the front end of the lens, and the flexible buffer structure is made of a soft material, and thus the invention not only protects the lens from being damaged by its collisions with a testing object, but also maintains the yield rate of the products and facilitates the testing work at a near distance.

To achieve the foregoing objective, the present invention provides a buffer structure installed at a contact type lens and comprising: a flexible sheathing ring, a through hole formed on the sheathing ring and corresponding to the lens; a circular contact pad portion extended outward from a lower end of the sheathing ring; and a circular sheathing portion formed at an upper end of the sheathing ring for coupling the lens.

To achieve the foregoing objective, the present invention provides a contact type lens of a buffer structure, and comprises a lens; a buffer structure installed at the front end of the lens, and the buffer structure comprises a flexible sheathing ring, a through hole formed on the sheathing ring and corresponding to the lens; a circular contact pad portion extended outward from the sheathing ring; and a circular sheathing portion formed at an upper end of the sheathing ring, and the sheathing portion is coupled to the front end of the lens.

BRIEF DESCRIPTION OF DRAWINGS

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

The technical characteristics, features and advantages of the present invention will become apparent in the following detailed description of the preferred embodiments with reference to the accompanying drawings. The drawings are provided for reference and illustration only, but not intended for limiting the present invention.

Figure 1:
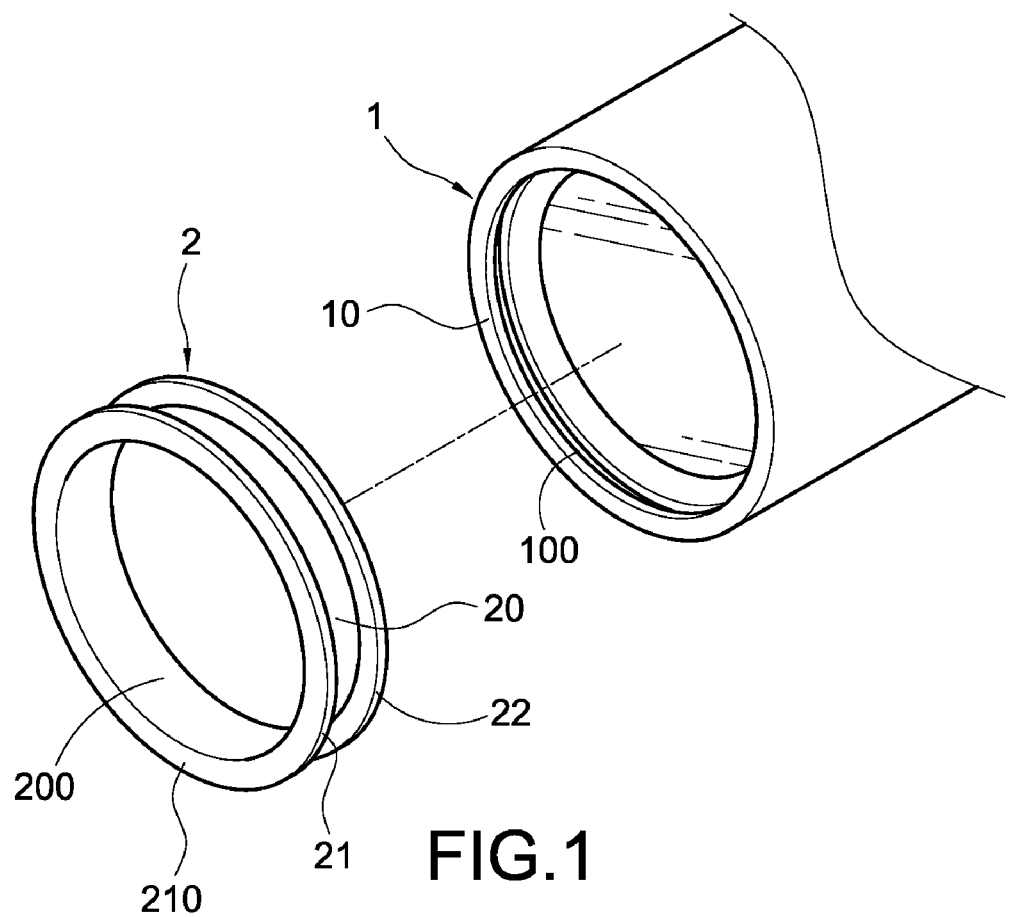
FIG. 1 is a schematic view of a buffer structure separated from a lens in accordance with the present invention.
Figure 2:
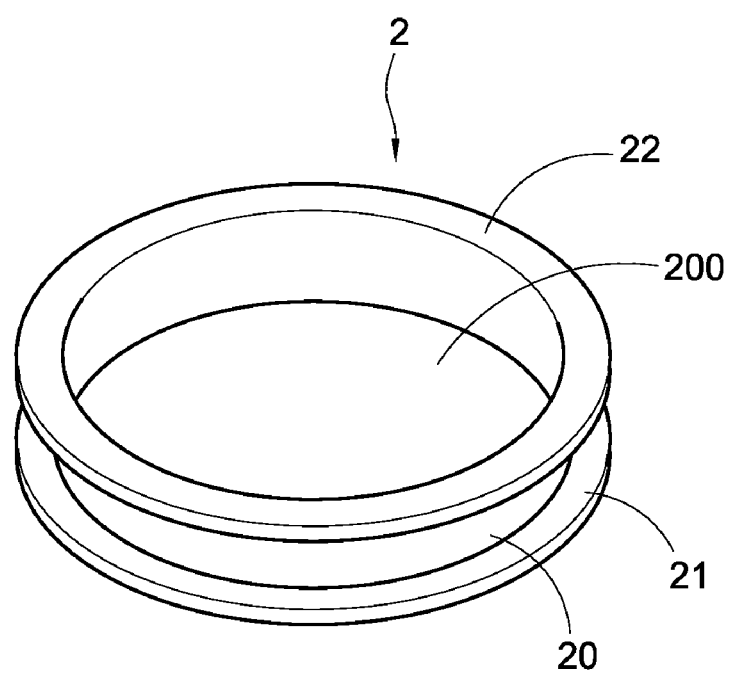
FIG. 2 is a perspective view of a buffer structure in accordance with the present invention.
Figure 3:
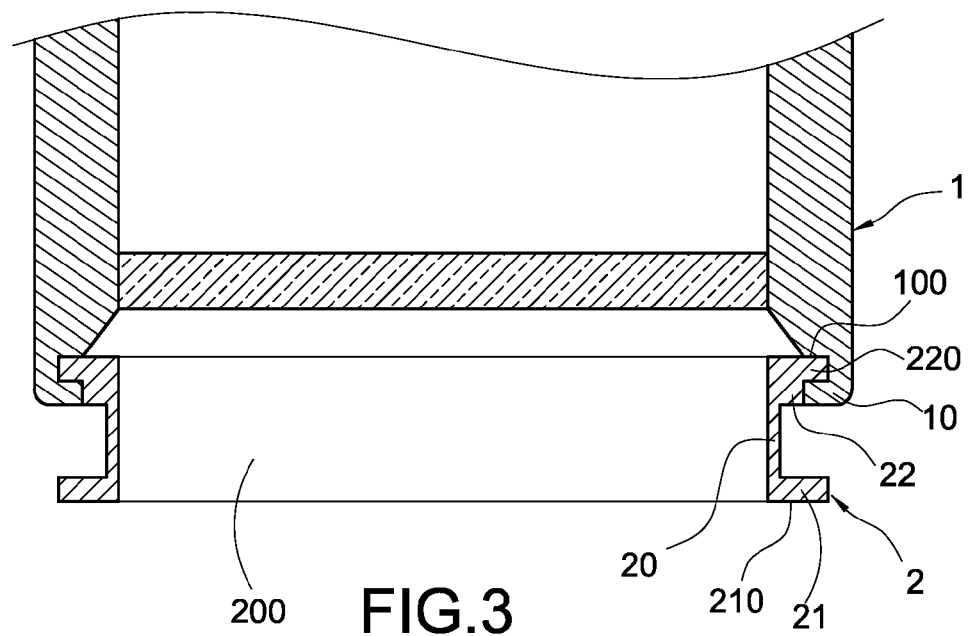
FIG. 3 is a schematic cross-sectional view of the portion of a lens and a buffer structure in accordance with the present invention.

Referring to FIGS. 1 to 3 for a schematic view of a buffer structure separated from a lens, a perspective view of a lens and a cross-sectional view of a lens and a buffer structure in accordance with the present invention respectively, the present invention provides a buffer structure of a contact type lens and a contact type lens having the buffer structure. The contact type lens 1 includes a front end 10 and a buffer structure 2 disposed at the front end 10 of the contact type lens 1.

When the contact type lens 1 examines a testing object at a near distance, it is necessary to set the front end of the lens 1 at a position very near to the testing object, or even attach or contact the lens 1 with the testing object. The present invention mainly installs a buffer structure 2 at the front end 10 of the contact type lens 1, and the buffer structure 2 is made of a soft material to prevent a possible damage caused by collisions between the lens 1 and the testing object when the testing object is examined at a near distance, and assists the lens 1 to be placed horizontally onto the testing object for the examination.

The buffer structure 2 is made of a flexible material and has a flexible sheathing ring 20, and the sheathing ring 20 forms a through hole 200 of a window corresponding to the front end 10 for allowing the lens 1 to perform a test. The lower end of the sheathing ring 20 forms a circular soft contact pad portion 21, and the contact pad portion 21 is formed and extended downward and outward from the sheathing ring 20, and the bottom of the contact pad portion 21 has a surface 210 in contact with the testing object and the flexibility of the sheathing ring 20 can provide an appropriate attachment with the testing object.

Further, a circular sheathing portion 22 is integrally formed at an upper end of the sheathing ring 20, and the sheathing portion 22 is provided for fixing the buffer structure 2 to the front end 10 of the lens 1. In a preferred embodiment of the present invention, the sheathing portion 22 has a flange 220 disposed internally and externally on an external wall of the sheathing portion 22 and a circular groove 100 concavely formed in a window at the front end 10 of the lens 1. Since the buffer structure 2 is made of a soft material, therefore the flange 220 can be squeezed into the groove 100, and the sheathing portion 22 can be sheathed into the front end of the lens 1, so as to achieve the purpose of coupling the buffer structure 2 with the lens 1.

With the foregoing components, the buffer structure of contact type lens and contact type lens having buffer structure in accordance with the present invention can be achieved.

Figure 4:
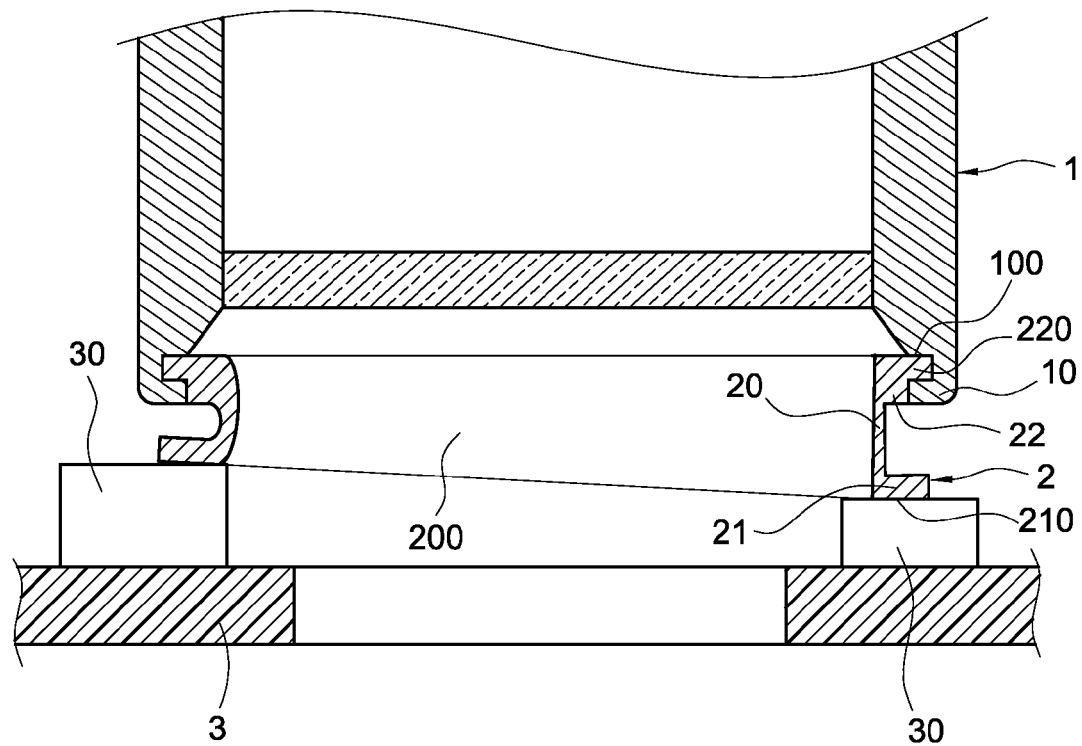
FIG. 4 is a schematic cross-sectional view of an application of the present invention.

Referring to FIG. 4 for a schematic view of performing a test at a near distance, the present invention adopts a circuit board 3 as the testing object for the illustration of the invention. In FIG. 4, a lens 1 may not be placed easily onto the circuit board 3 for the testing due to the different heights of electronic components 30 on the circuit board 3, when a testing is taken place at a near distance apart from a solder hole or a copper clad circuit of the circuit board 3. With the buffer structure 2, a contact pad portion 21 can be installed across each electronic component 30, and the flexible sheathing ring 20 can produce an appropriate deformation, such that the lens 1 can be placed flatly onto a surface of the electronic component 30 without being tilted or slanted or affecting the testing. The flexibility of the buffer structure 2 can prevent different electronic components 30 from being collided with the lens and greatly reduce possible damage.

Figure 5:
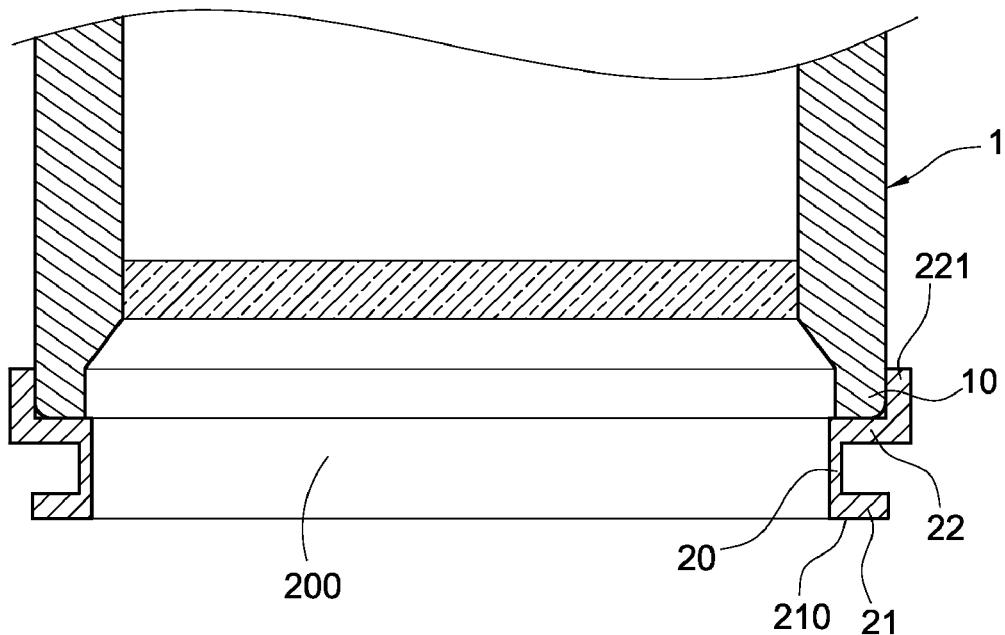
FIG. 5 is a schematic cross-sectional view of the portion of a lens and a buffer structure in accordance with another preferred embodiment of the present invention.

Referring to FIG. 5 for a schematic cross-sectional view of the portion of a lens and a buffer structure in accordance with another preferred embodiment of the present invention, a sheathing portion 22 of the buffer structure 2 of this embodiment includes an external sheathing edge 221 extended upward from the top of the sheathing portion 22 for sheathing and coupling the front end 10 of the lens 1 to the external sheathing edge 221.

Figure 6:
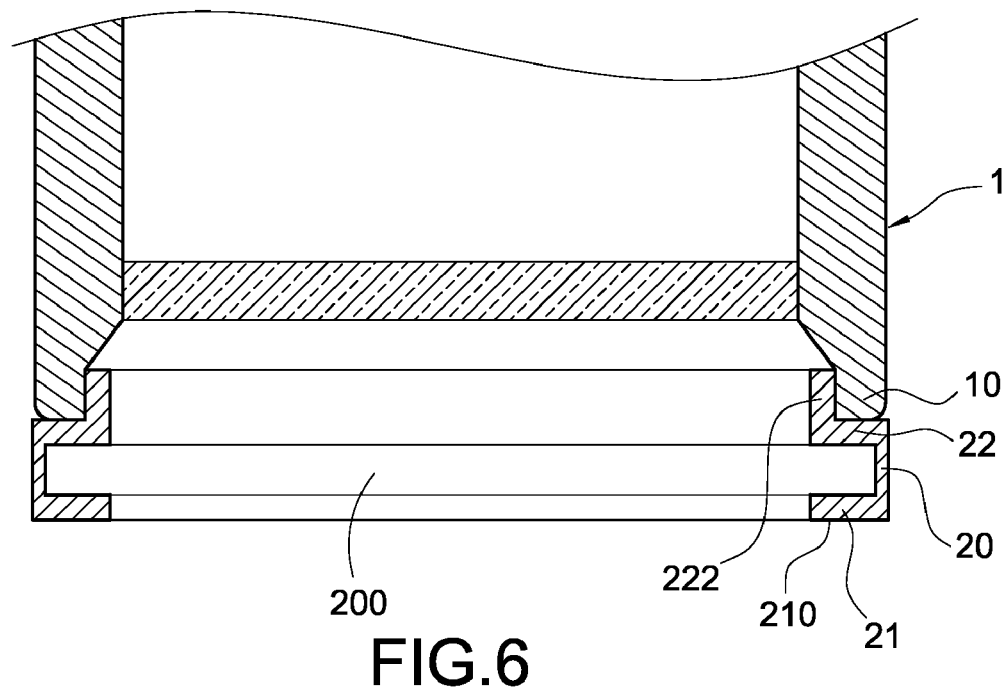
FIG. 6 is a schematic cross-sectional view of the portion of a lens and a buffer structure in accordance with a further embodiment of the present invention.

Referring to FIG. 6 for a schematic cross-sectional view of the portion of a lens and a buffer structure in accordance with a further embodiment of the present invention, a sheathing portion 22 includes an internal sheathing edge 222 extended upward from the top of the sheathing portion 22, and the internal sheathing edge 222 is sheathed and coupled to a window at the front end 10 of the lens 1.

In summation of the description above, the present invention that overcomes the shortcomings of the prior art, enhances the performance of the conventional structure, and complies with the patent application requirements is duly file for patent application.

The present invention is illustrated with reference to the preferred embodiment and is not intended to limit the patent scope of the present invention. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A buffer structure installed at a contact type lens, comprising:
    a sheathing ring, having a flexibility and forming a through hole corresponding to the lens;
    a contact pad portion, being in a circular shape, and extended outward from a lower end of the sheathing ring; and
    a sheathing portion, being in a circular shape, and formed at an upper end of the sheathing ring, for coupling the lens,
        wherein the sheathing portion has an external sheathing edge extended upward from the top of the sheathing portion for sheathing and coupling the external sheathing edge to the front end of the lens.

2. The buffer structure of claim 1, wherein the sheathing portion has an internal sheathing edge extended upward from the top of the sheathing portion, and the internal sheathing edge is sheathed into and coupled with a window at the front end of the lens.

3. A contact type lens having a buffer structure, comprising:
    a lens; and
    a buffer structure, installed at the front end of the lens front end;
wherein the buffer structure comprises a flexible sheathing ring, a through hole disposed on the sheathing ring and corresponding to the lens, a circular contact pad portion extended outward from a lower end of the sheathing ring, and a circular sheathing portion formed at the top of the sheathing ring, such that the sheathing portion is coupled to the front end of the lens,
    wherein the sheathing portion of the buffer structure has a flange disposed externally and internally on an external wall of the sheathing portion, and a circular groove concavely formed at an internal circular surface of the front end of the lens, and the flange is disposed in and coupled with the groove.

4. A contact type lens having a buffer structure, comprising:
    a lens; and
    a buffer structure installed at the front end of the lens front end;
wherein the buffer structure comprises a flexible sheathing ring, a through hole disposed on the sheathing ring and corresponding to the lens, a circular contact pad portion extended outward from a lower end of the sheathing ring, and a circular sheathing portion formed at the top of the sheathing ring, such that the sheathing portion is coupled to the front end of the lens,
    wherein the sheathing portion of the buffer structure has an external sheathing edge extended upward from the top of the sheathing portion, and the front end of the lens is sheathed into and coupled with the external sheathing edge.

5. The contact type lens having a buffer structure of claim 3, wherein the sheathing portion of the buffer structure has an internal sheathing edge extended upward from the top of the sheathing portion, and the internal sheathing edge is sheathed into and coupled with the front end of the lens.

6. The contact type lens having a buffer structure of claim 4, wherein the sheathing portion of the buffer structure has an internal sheathing edge extended upward from the top of the sheathing portion, and the internal sheathing edge is sheathed into and coupled with the front end of the lens.

* * * * *